United States Patent [19]

Morino et al.

[11] Patent Number: 4,937,603
[45] Date of Patent: Jun. 26, 1990

[54] MULTIPLE EXPOSURE PHOTOGRAPHIC DEVICE FOR CAMERA

[75] Inventors: Yukio Morino; Yoichi Seki; Michitaka Nakazawa; Toshiaki Hirai; Yusuke Konishi; Michio Taniwaki; Katsuhito Niwa; Kenichi Watanabe, all of Yotsukaido, Japan

[73] Assignee: Seikosha Co., Ltd., Japan

[21] Appl. No.: 370,236

[22] Filed: Jun. 22, 1989

[30] Foreign Application Priority Data

Jun. 24, 1988 [JP] Japan .................................. 63-156380

[51] Int. Cl.⁵ .............................................. G03B 9/08
[52] U.S. Cl. .................................... 354/234.1; 354/236
[58] Field of Search ...................... 354/236, 234.1, 209

[56] References Cited

U.S. PATENT DOCUMENTS 3,747,495 7/1973 Tenkumo et al. ............... 354/236 X

Primary Examiner—Michael L. Gellner
Attorney, Agent, or Firm—Bruce L. Adams; Van C. Wilks

[57] ABSTRACT

A camera capable of multiple exposure photography. The camera has a lens shutter for performing a programmed exposure operation and a diaphragm-adjusting operation and a focal-plane shutter. The camera further includes a first selector means and a second selector means. The operation mode of the camera is switched between a lens shutter mode and a focal-plane shutter mode by the first selector means. In the lens shutter mode, the lens shutter is operated as a programmed shutter. In the focal-plane shutter mode, the shutter speed and the aperture are controlled by the focal-plane shutter and the lens shutter, respectively. The second selector means establishes a multiple exposure photographic mode. Also, the second selector means sets up the lens shutter mode irrespective of the setting of the first selector means.

3 Claims, 5 Drawing Sheets

MULTIPLE EXPOSURE PHOTOGRAPHIC DEVICE FOR CAMERA

FIELD OF THE INVENTION

The present invention relates to a camera equipped with both a lens shutter and a focal-plane shutter.

BACKGROUND OF THE INVENTION

Cameras equipped with a lens shutter and cameras equipped with a focal-plane shutter are well-known.

A camera equipped with a lens shutter is adapted for flash photography because of the feature of the shape of the shutter opening. On the other hand, the lens of a camera having a focal-plane shutter can be easily replaced because of the feature of the light-blocking structure. Also, the latter camera enables high-speed time control because of the characteristics of the operation.

In an attempt to combine the features of the aforementioned two cameras, an interchangeable lens which has a lens shutter operating alone inside a camera equipped with a focal-plane shutter has been proposed.

The present applicant has already proposed a camera equipped with a lens shutter and a focal-plane shutter for performing a programmed exposure operation and a diaphram-adjusting operation. The camera further includes a selector means for establishing either a lens shutter mode or a focal-plane shutter mode, a first driving means, a second driving means, and a sequential control means. In the lens shutter mode, the lens shutter is operated as a programmed shutter. In the focal-plane shutter mode, the shutter speed and the aperture are controlled by the focal-plane shutter and the lens shutter, respectively. The first driving means controls either the programmed exposure value of the lens shutter of the aperture value or both. The second driving means controls the time for which the focal-plane shutter is operated. The sequential control means controls the timing at which the two driving means are activated.

In the focal-plane shutter mode, when plural photographs are taken in succession with multiple exposure, a clutch mechanism is needed to select either the cocking of the focal-plane shutter or the winding of the film, so that the focal-plane shutter is cocked for every exposure. This necessity arises from the fact that a single motor is generally used to cock the focal-plane shutter and to wind up the film. Conversely, to omit the clutch mechanism, two motors are necessary. Thus, the structure of this camera system has problems. As shown in FIG. 8, since the focal-plane shutter is cocked for every exposure, the next exposure is not enabled during the time T2 for which the shutter is cocked. Consequently, it is impossible to take photographs in succession at a high speed with multiple exposure.

SUMMARY OF THE INVENTION

In view of the foregoing problems, the present invention has been made.

It is an object of the invention to provide a multiple exposure photographic device which is for use in a camera and which is equipped with both a lens shutter and a focal-plane shutter, is simple in structure, can be fabricated in small size, and permits shots to be taken at short intervals.

The above object is achieved in accordance with the teachings of the invention by a photographic device for use in a camera, the device comprising a lens shutter for performing a programmed exposure operation and a diaphragm-adjusting operation, a focal-plane shutter, a first selector means that sets the operation mode of the camera either to a lens shutter mode in which the lens shutter is operated as a programmed shutter or to a focal-plane shutter mode in which the shutter speed and the aperture are controlled by the focal-plane shutter and the lens shutter, respectively, and a second selector means which switches the operation mode of the camera from a single exposure photographic mode to a multiple exposure photographic mode and which establishes the lens shutter mode irrespective of the setting of the first selector means.

DETAILED DESCRIPTION OF THE INVENTION

Figure 1A:
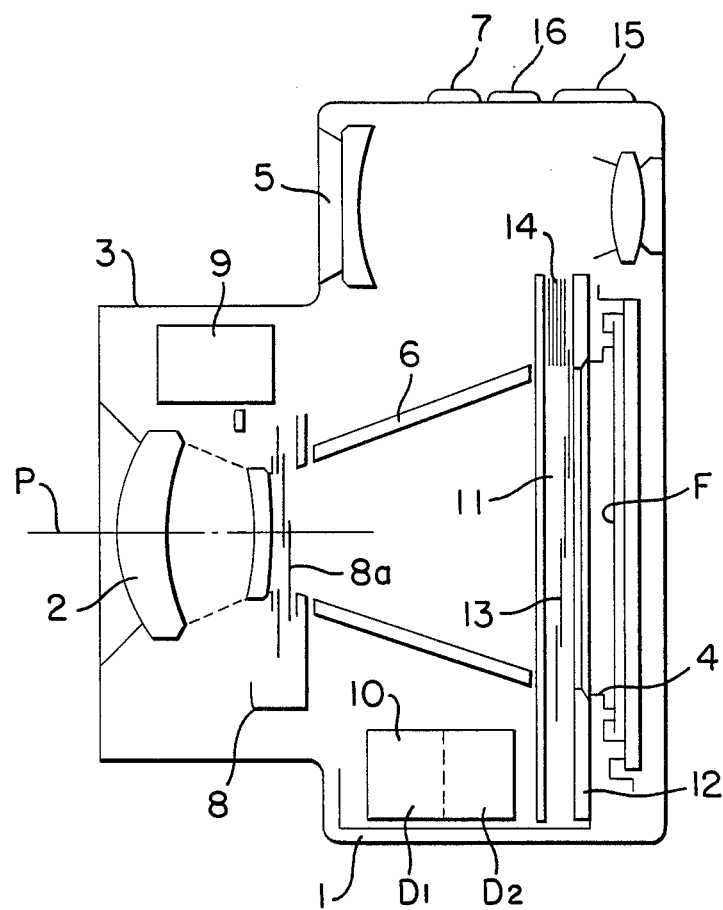
FIG. 1(a) is a cross-sectional view of a camera according to the invention.
Figure 1B:
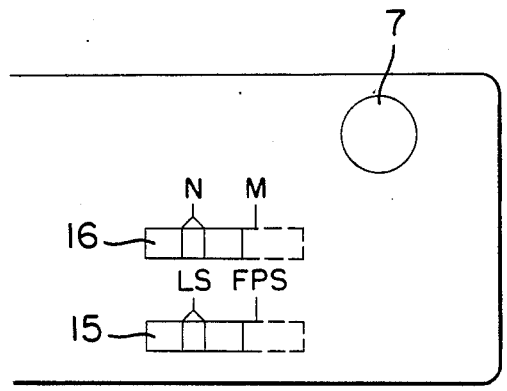
FIG. 1(b) is a top view of the camera shown in FIG. 1(a)

Referring to FIGS. 1(a) and 1(b), there is shown a camera embodying the concept of the invention. The body of the camera is indicated by numeral 1. In the body 1, a lens 2 is held to a lens barrel 3. An image of a subject which is passed through the lens 2 is focused onto a photosensitive material F (hereinafter referred to as the film). The film F is received behind the limits of the field of view 4.

A viewfinder 5 having a frame defining the field of view is mounted on the top of the camera body. A shade cylinder 6 shields the film F against deleterious light coming from the portions other than the lens 2. A shutter release 7 for operating the camera is mounted on the upper surface of the camera. A lens shutter 8 which opens or closes the lens opening is mounted behind the lens 2. The shutter 8 has blades 8a which usually close the lens opening.

A stepper motor 9 is disposed inside the lens barrel 3 and drives the shutter blades 8a in response to the output signal from a first driving means D1, the blades 8a acting also as a diaphragm. The operation of the motor 9 is controlled by an electronic circuit 10 comprising the first driving mans D1, a sequential control circuit SC that controls the timing at which the shutters are activated, a photometric circuit, and a second driving means (described latter). The photometric circuit includes photocells for measuring the brightness of the subject. Since all of the these components are well-known, they are not described in detail herein.

A focal-plane shutter 11 consists of a first blind 13 and a second blind 14 both of which are held to a base 12 mounted to the camera body 1. When two electromagnets (not shown) are successively energized by the second driving means D2 of the electronic circuit 10 of the known structure, the two blinds are driven at a desired interval to control the exposure time. The shutter 11 is cocked by a known method when the film is fed.

A first selector means 15 is mounted on the top of the camera to determine whether the focal-plane shutter 11 or the lens shutter 8 is used to take a photograph. A second selector means 16 is mounted on the top of the camera to determine whether single exposure or multiple exposure is employed in taking photographs.

Figure 2:
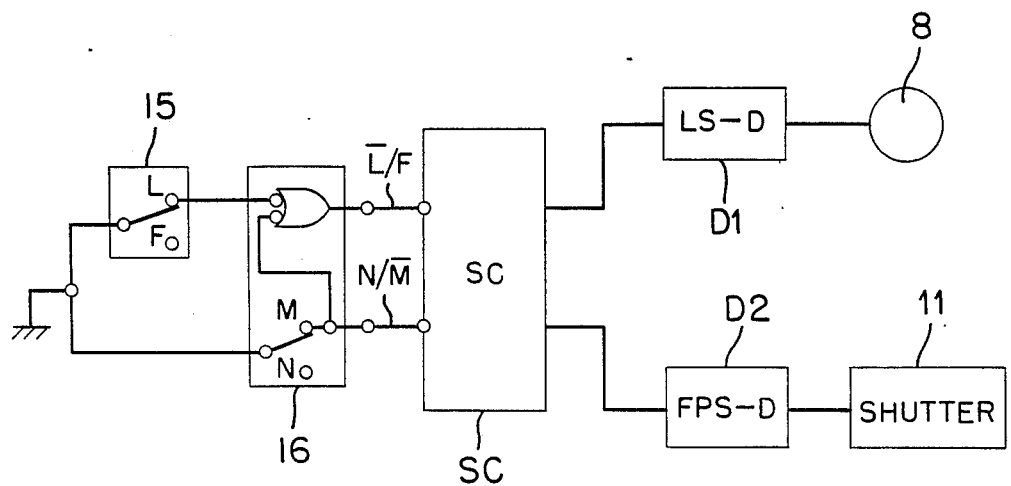
FIG. 2 is a block diagram of the camera shown in FIG. 1(a)

FIG. 2 is a block diagram illustrating the operation of the camera constructed as described thus far. The first selector means 15 determines whether the focal-plane shutter 11 or the lens shutter 8 operates. The second selector means 16 selects either a single exposure photographic mode or multiple exposure photographic mode. When terminal L of the first selector means 15 is connected into the circuit, a signal $\overline{LF}$ applied to the sequential control circuit SC goes low. When terminals F and M of the first and second selector means 15 and 16, respectively, are connected into the circuit, the signal $\overline{LF}$ also goes low. When the signal $\overline{LF}$ fed to the sequential control circuit SC is at a low level, the lens shutter 8 operates. When it is at a high level, the focal-plane shutter 11 operates. Another signal $N/\overline{M}$ is applied to the sequential control circuit SC. When this signal $N/\overline{M}$ is at a low level, the operation mode of the camera is set to the multiple exposure photographic mode. When it is at a level, the operation mode is set to the single exposure photographic mode. The sequential control circuit SC activates the focal-plane shutter 11 and the lens shutter 8 in response to the output signal from the first selector means 15 such that the first driving means D1 and the second driving means D2 are operated at predetermined timing.

Figure 3:
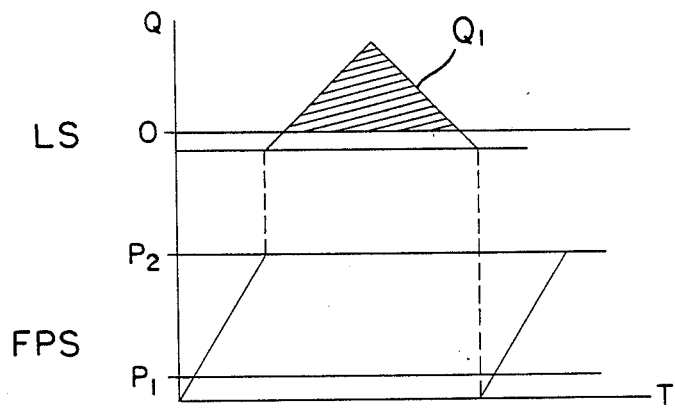
FIGS. 3 and 4 are diagrams illustrating the operation of the camer shown in FIG. 1(a), and in which a lens shutter mode and a focal-plane shutter mode are respectively established.
Figure 4:
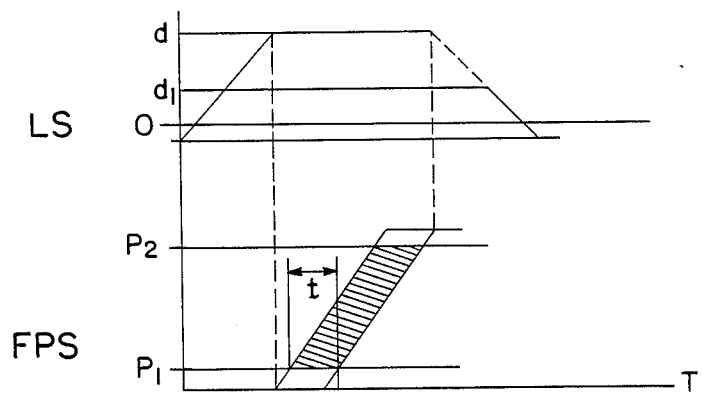

The manner in which the sequential control circuit is operated is next described by referring to FIGS. 3 and 4. In each of these figures, the amount of exposure on the field of view 4 or the positioned of the field of view is plotted against the elapsed time.

FIG. 3 is a diagram illustrating the operation, and in which the first selector means 15 sets the operation mode to the lens shutter mode. In this mode, the exposure operation is performed by the lens shutter 8. When a shutter release 7 shown in FIG. 1 is depressed to take a photograph, the sequential control circuit SC first causes the second driving means D2 to produce a signal, for moving the front blind 13 of the focal-plane shutter 11 from one end P1 of the field of view to the other end P2. As a result, the field of view 4 is opened.

Then, the sequential control circuit SC instructs the first driving means D1 to deliver a signal which activates the lens shutter 8. The film F is exposed with a light amount corresponding to a region Q1. At this time, a programmed exposure operation in which an aperture and a time are combined according to the brightness of the subject is performed.

Subsequently, the sequential control circuit SC orders the second driving means D2 to produce an output signal. This moves the second blind 14 of the focal-plane shutter 11 from one end P1 to the other end P2.

Upon completion of the operation of the focal-plane shutter 11, the sequential control circuit SC produces a signal to wind up the film F until the next frame appears. Also, the circuit operates an electric motor (not shown) to cock the focal-plane shutter 11. Thus, the photography in the lens shutter mode is completed.

FIG. 4 is a diagram illustrating the manner in which the first selector means 15 sets the operation mode of the focal-plane shutter mode. In this mode, the focal-plane shutter 11 performs an exposure operation.

When the shutter release 7 shown in FIG. 1 is depressed to take a photograph, the sequential control circuit SC first causes the first driving means D1 to produce an output signal so that the lens shutter 8 may be opened to a desired aperture value d1. In this way, the lens opening is opened.

Then, the sequential control circuit SC causes the second driving means D2 to produce a signal which successively activates the first blind 13 and the second blind 14 of the focal-plane shutter 11, thus exposing the film F. At this time, the blinds 13 and 14 operate at an interval t which determines the aperture value d1 of the lens shutter 8 according to the brightness of the subject to provide an appropriate exposure. Thereafter, the sequential control circuit SC causes the first driving means D1 to produce an output signal, for closing the lens shutter 8.

When the operation of the lens shutter 8 is complete, the sequential control circuit SC delivers an output signal to wind up the film F until the next frame appears. At the same time, the circuit drives the motor (not shown) to cock the focal-plane shutter 11. Thus, the photography in the focal-plane shutter mode is completed.

Figure 5:
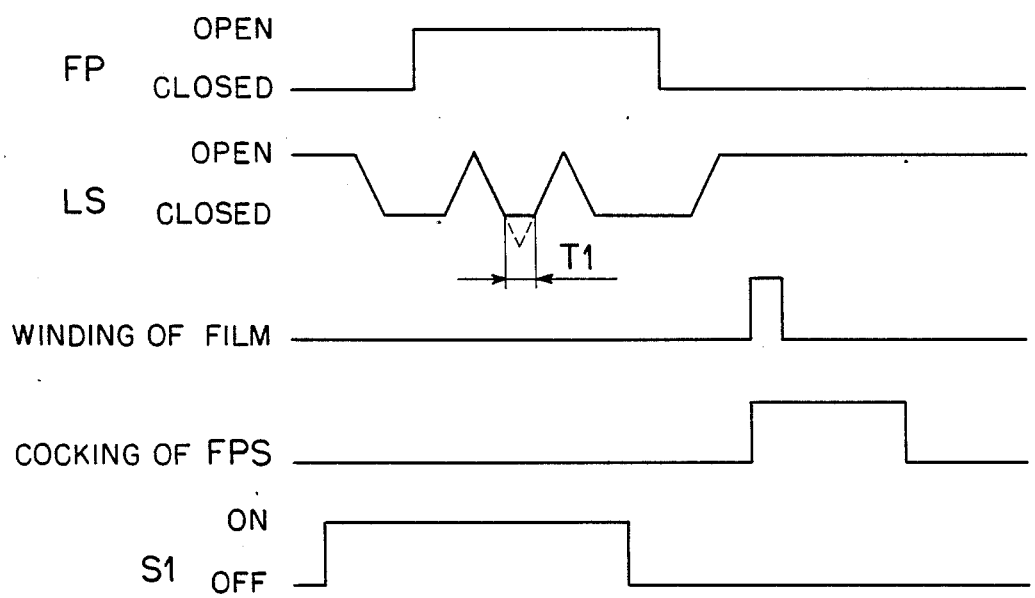
FIGS. 5 and 6 are diagrams illustrating the operation of a multiple exposure photographic mode of a single-lens reflex camera and the operation of a multiple exposure photographic mode of a coupled rangefinder camera, respectively.

FIG. 5 is a diagram illustrating the operation of a single-lens reflex camera, and in which the second selector means 16 is switched to the other state to establish the multiple exposure photographic mode. As described already, when this mode is established, the first selector means 15 is automatically switched by the sequential control circuit SC to the other state for the lens shutter mode whether the focal-plane shutter mode or the lens shutter mode is established by the first selector means 15.

Figure 6:
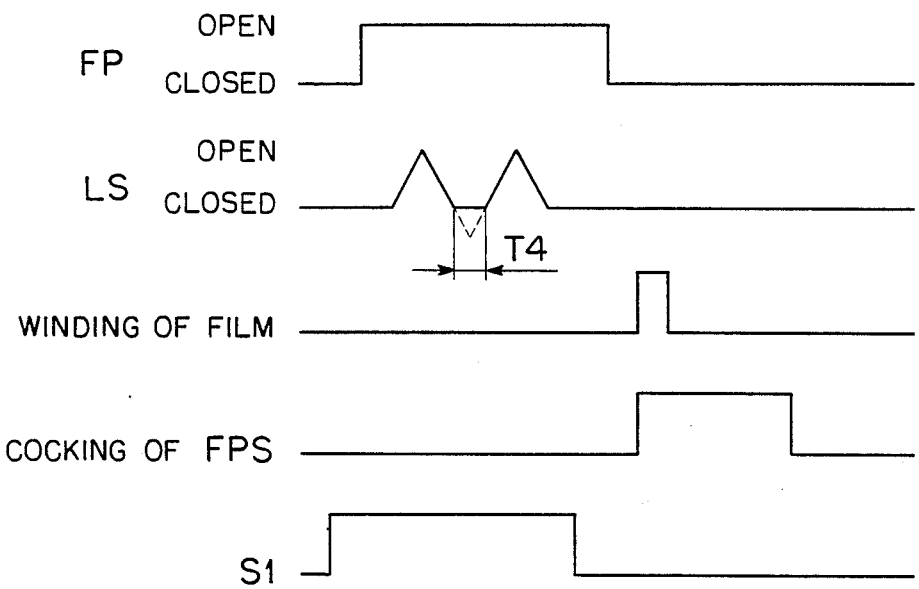

Then, the shutter release on the camera is depressed to turn on a power switch S1. After the focal-plane shutter 11 is opened, the lens shutter 8 repeats the exposure operation. When the shutter release regains its original state, the power switch S1 is turned off to thereby close the focal-plane shutter 11. Upon completion of the operation of the focal-plane shutter 11, the film is wound up, and the focal-plane shutter 11 is cocked. Thus, the multiple exposure photography is completed. The time period of closing and next opening of blades. is indicated by T1. During this period, the blinds overlap. The rangefinder camera operating as illustrated in the diagrams of FIG. 6 yields similar advantages.

Figure 1C:
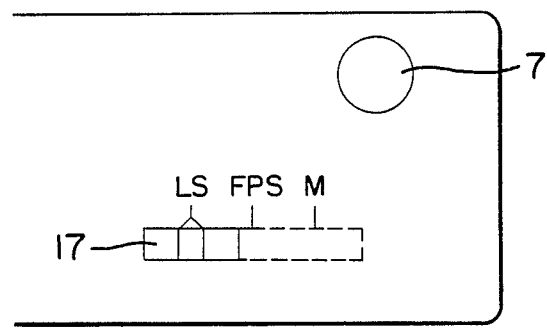
FIG. 1(c) is a top view of another camera according to the invention.

FIG. 1(c) shows another example of the invention. In this example, selector means 17 is mounted on the top of a camera to determine whether the focal-plane shutter 11 or the lens shutter 8 is used for photography or whether multiple exposure photography is carried out.

Figure 7:
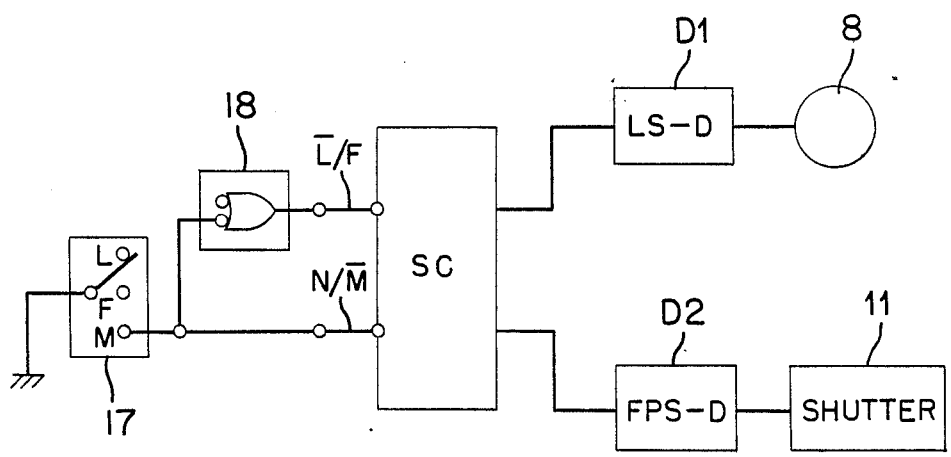
FIG. 7 is a block diagram of the camera shown in FIG. 1(c)
Figure 8:
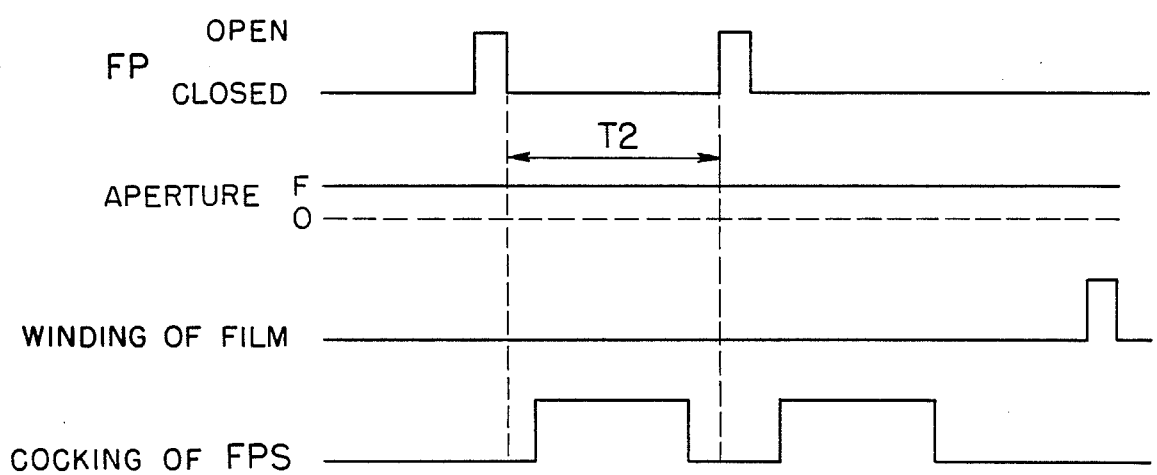
FIG. 8 is a diagram illustrating the operation of a known camera.

FIG. 7 is a block diagram illustrating the operation of this example. The sequential control circuit SC receives the signals $\overline{LF}$ and $N/\overline{M}$ in the same as in the example shown in FIG. 2. When terminal M of the selector means 17 is connected into the circuit, the signal $\overline{LF}$ automatically goes low to activate the lens shutter 8. In the example shown in FIG. 2, a switch controller is included in the second selector switch. In the example shown in FIG. 7, a switch controller 18 is provided independent of the second selector switch.

As can be understood from the above description, the novel camera can operate either in the lens shutter mode or in the focal-plane shutter mode. Whenever the multiple-exposure photographic mode is established, the operation mode of the camera is switched to the lens shutter mode. Therefore, during multiple exposure photography, it is not necessary to cock the focal-plane shutter. This dispenses with the clutch mechanism between the mechanism cocking the focal-plane shutter and the mechanism for winding up the film. For this reason, the camera can be made simpler in structure and compact. Also, the camera can be fabricated economically. Furthermore, when several photographs are taken in succession with multiple exposure, no mechanical cocking operation is performed between successive shots. Where the shutter is cocked by an electronic motor, the consumption of energy stored in batteries is reduced. In addition, photographs can be taken at shorter intervals.

What is claimed is:

1. A multiple exposure photographic device for use in a camera, comprising:

a lens shutter for performing a programmed exposure operation and a diaphragm-adjusting operation;

a focal-plane shutter providing a first blind and a second blinde;

a first selector means that sets the operation mode of the camera either to a lens shutter mode in which the lens shutter is operated as a programmed shutter or to a focal-plane shutter mode in which the shutter speed and the aperture are controlled by the focal-plane shutter and the lens shutters, respectively; and a second selector means which switches the operation mode of the camera from a single exposure photographic mode to a multiple exposure photographic mode and which establishes the lens shutter mode irrespective of the setting of the first selector means.

2. The multiple exposure photographic device of claim 1, wherein both first and second selector means are connected with a sequential control circuit that controls the operation of the lens shutter and the focal-plane shutter.

3. The multiple exposure photographic device of claim 1, wherein either the first selector means or the second selector means includes a logic element.

* * * * *